United States Patent [19]
Giese et al.

[11] Patent Number: 5,795,257
[45] Date of Patent: Aug. 18, 1998

[54] TENSIONING DEVICE FOR TRACTION MEANS WITH CONE-TYPE SLIDING BEARING

[75] Inventors: Peter Giese, Herzogenaurach; Werner Petri, Erlangen; Mattis Räcke, Karlsruhe, all of Germany

[73] Assignee: Ina Wälzlager Schaeffler KG, Herzogenaurach, Germany

[21] Appl. No.: 741,213

[22] Filed: Oct. 29, 1996

Related U.S. Application Data

[60] Provisional application No. 60/006,929 Nov. 17, 1995.

[30] Foreign Application Priority Data

Nov. 2, 1995 [DE] Germany .................. 195 40 706.7

[51] Int. Cl.⁶ .................. F16H 7/08; F16H 7/22; F16H 7/12
[52] U.S. Cl. .................. 474/109; 474/133; 474/135
[58] Field of Search .................. 474/101, 109, 474/133, 135

[56] References Cited

U.S. PATENT DOCUMENTS

| | | | |
|---|---|---|---|
| 4,464,146 | 8/1984 | Arthur | 474/133 |
| 5,236,396 | 8/1993 | Golovatai-Schmidt et al. | 474/101 |
| 5,599,245 | 2/1997 | Giese | 474/135 |

*Primary Examiner*—Tamara L. Graysay
*Assistant Examiner*—Gary S. Hartmann
*Attorney, Agent, or Firm*—Henry M. Feiereisen

[57] ABSTRACT

A tensioning device for a traction element includes a tensioner arm having a tension roller which is spring-loaded against the traction element. The tensioner arm is rotatably supported relative to a housing by means of a conical sliding bearing exhibiting parallel sliding bearing surfaces which extend concentric to the tensioner arm shaft. A helical torsion spring wound along the tensioner arm shaft and clamped between a support secured on the tensioner arm and a fixed support area exerts an axial force which is introduced into the sliding bearing as a reaction force perpendicular to the sliding bearing surfaces.

14 Claims, 4 Drawing Sheets

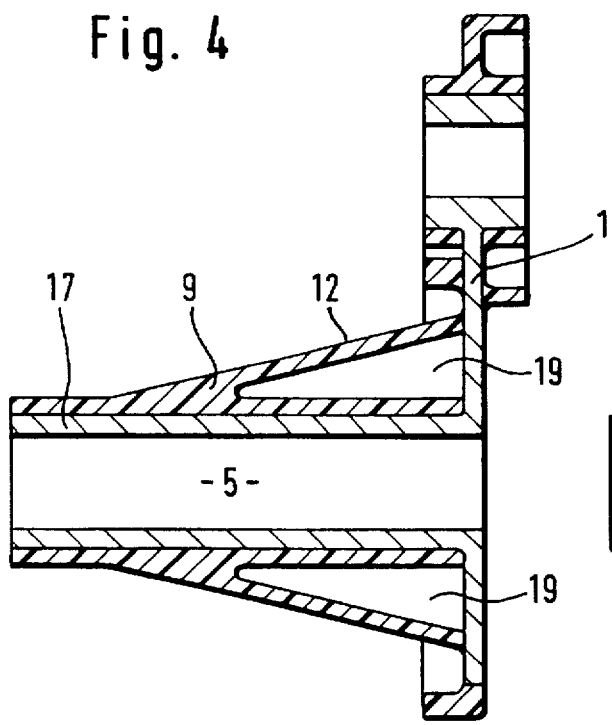
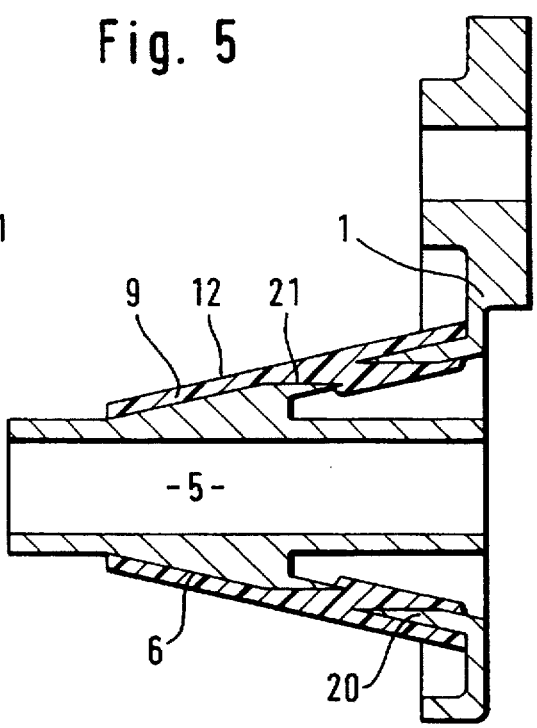
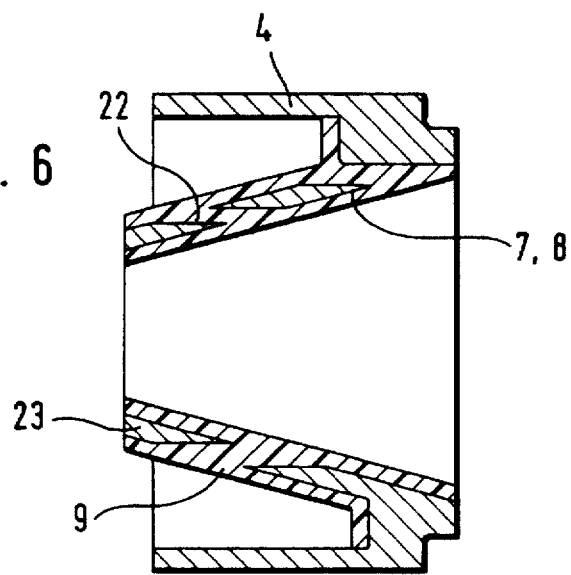

5,795,257

1

TENSIONING DEVICE FOR TRACTION MEANS WITH CONE-TYPE SLIDING BEARING

CROSS-REFERENCES TO RELATED APPLICATIONS

This application claims benefit of prior filed copending provisional application Appl. No. 60/006,929, filed Nov. 17, 1995.

BACKGROUND OF THE INVENTION

The present invention refers to a tensioning device for traction means such as belts and chains, and in particular to a tensioner of a type including a tensioner arm which carries a tensioning member, preferably a tension roller, and is spring-loaded in direction toward the traction means, with the tensioner arm being rotatably supported relative to a fixed structure by means of a conical sliding bearing which exhibits sliding bearing surfaces in parallel relationship to one another and positioned concentrically to the tensioner arm shaft, and a helical torsion spring wound about the tensioner arm shaft and extending between a support secured on the tensioner arm and a fixed support.

A tensioning device of this type is known e.g. from U.S. Pat. No. 4,698,049. The tensioner arm shaft and the fixed structure exhibit each a conical surface, with a conical sliding bearing bush being disposed between these two conical surfaces. A radial play in the sliding bearing caused by abrasive wear on the sliding bearing surfaces requires that the conical surfaces of the sliding bearing be pushed manually toward each other in axial direction and so positioned that the radial play in the sliding bearing again lies within an admissible tolerance range.

SUMMARY OF THE INVENTION

It is an object of the present invention to provide an improved tensioning device of this type, obviating the afore-stated drawbacks.

In particular, it is an object of the present invention to provide an improved tensioning device which allows an automatic adjustment of the sliding bearing surfaces in a simple and yet reliable manner.

These objects and others which will become apparent hereinafter are attained in accordance with the present invention by incorporating a helical torsion spring which is so clamped between a support secured to the tensioner arm and a fixed support as to exert an axial force which is introduced into the sliding bearing in the form of a reaction force that acts perpendicular to the sliding bearing surfaces.

The provision of such a tensioning device results in numerous advantages. Firstly, it is ensured that upon abrasive wear of the sliding bearing surfaces the axial force and the reaction force acting perpendicular to the sliding bearing surfaces pushes the sliding bearing surfaces together so as to effect a clearance-free sliding bearing. At constant angle of inclination of the sliding bearing surfaces relative to their axis, the reaction force can be varied commensurate with the axial attachment and the axial force of the helical torsion spring.

Typically, the sliding bearing includes a conical sliding bearing bush of plastic material which is in frictional contact and thus subject to increased wear by sliding friction as a consequence of the perpendicular reaction force. This wear by sliding friction is compensated without any problems by a self-adjusting motion of the tensioner arm and the fixed

2 structure. When the tensioner arm shaft and the fixed structure are each formed with a conical surface, it is possible to loosely dispose the conical sliding bearing bush between these conical surfaces. At operation, a sliding friction is normally encountered between the outer conical surface of the sliding bearing bush and the adjoining stationary or tensioner arm fixed conical surface at same friction conditions on the sliding bearing surfaces. The helical torsion spring of the tensioning device according to the present invention is subject to a torsional load in a same manner as described in the prior art and spring-loads the tensioner arm against the traction means.

U.S. Pat. No. 4,698,049 further discloses a damping unit for damping swinging motions of the tensioner arm relative to the fixed structure. This damping unit is formed by providing the fixed structure and the tensioner arm shaft with terminal end faces that oppose each other, with a friction disk being disposed between theses end faces. The end face associated to the fixed structure is formed on a separate disk. Compared to conventional tensioners, a tensioning device according to the present invention realizes a damping unit, without necessitating additional measures. The sliding friction between the sliding bearing surfaces is increased as a result of the reaction force and the resulting surface pressure, respectively, so that the desired damping effect is accomplished in both rotational directions of the tensioner arm.

In a helical torsion spring which is e.g. axially compressed to exert an axial force, a particularly advantageous disposition of the spring supports and the sliding bearing surfaces is attained when the sliding bearing surface associated to the tensioner arm is disposed radially outwards, and the sliding bearing surface associated to the fixed element is disposed radially inwards, whereby in direction from the converging ends of the sliding bearing surfaces toward the diverging ends of the sliding bearing surfaces, the fixed support is positioned ahead of the tensioner arm based support. It is however also conceivable to form, in the event the helical torsion spring is axially compressed to exert an axial pressure force, the sliding bearing surface associated to the tensioner arm radially inwards and the sliding bearing surface associated to the fixed structure radially outwards, whereby in direction from the converging ends of the sliding bearing surfaces toward the diverging ends of the sliding bearing surfaces, the tensioner arm based support is now positioned ahead of the stationary support. Both dispositions result in the generation of a reaction force that acts perpendicular to the sliding bearing surfaces, without necessitating any additional components or measures.

A tensioning device in accordance with the present invention is typically employed for aggregate drives of engines of motor vehicles. Upon construction of such a tensioning device, consideration should be taken also with regard to i.a. existing spatial needs.

In accordance with an especially space-saving embodiment of the tensioning device, the tensioner arm shaft fixed on the tensioner arm is formed radially within the sliding bearing with an axially open recess for receiving the helical torsion spring, whereby the recess is radially overlapped by the fixed support. This variation is particularly advantageous because the radially outer sliding bearing exhibits a reduced surface pressure as a consequence of the circumferentially increased sliding bearing surfaces, and therefore is subject to a reduced abrasive wear.

According to another embodiment of the present invention, which is particularly advantageous with respect to installation, the tensioning device includes a fixed structure of pot-shaped configuration with a bottom, a cover and a jacket between the bottom and the cover, for accommodating the tensioner arm fixed tensioner arm shaft, with the cover defining the fixed support for the helical torsion spring and being secured to the jacket e.g. by means of bayonet fastener. Suitably, the fixed structure is formed with a circumferential slot through which the tensioner arm is radially guided.

According to a further variation, the stationary tensioner arm shaft is formed with a cylindrical section, with a conical bush being secured, preferably detachably, to this section and exhibiting an outer conical surface and an inner cylindrical surface. The tapered end of the conical bush faces the tensioner arm shaft at an end that is distant to the tensioner arm, with the tensioner arm shaft being formed with a coaxial throughbore. This ensures that the tensioner arm, which is formed with a conical bore coaxial to the tensioner arm shaft, and the tensioner arm shaft, which is formed in one piece with the tensioner arm, can be placed together with the conical bush and the helical torsion spring on the tensioner arm shaft. As a result of the axial force exerted by the torsion spring, the tensioner arm and the conical bush are suitably secured against sliding off axially from the tensioner arm shaft. Suitably, a screw positioned in coaxial disposition to the tensioner arm shaft can be screwed into the end face of the tensioner arm end at the free end of the tensioner arm shaft, with one end of the conical bush being axially supported on the screw head. It may be suitable to guide this screw through the coaxial throughbore of the tensioner arm shaft and to screw it into the engine block. In this manner, the screw accomplishes two functions, that is, firstly, the securement of the tensioner arm shaft to the engine block, and, secondly, the axial securement of the tensioner arm and the conical bush.

In accordance with a further feature of the present invention, the support is formed by a support disk which is secured to the tensioner arm shaft at an end facing away from the tensioner arm, with the converging ends of the sliding bearing surfaces facing the support disk. In such a tensioning device, the fixed support is preferably formed with a conical bore which exhibits a diverging end adjacent the tensioner arm. The tensioner arm shaft, formed preferably in one piece with the tensioner arm, is inserted in the conical bore and has a free end axially extending beyond this conical bore, with the support disk being preferably press-fitted on this end. In this case, there is no need to specially secure the support disk against axial displacement upon the tensioner arm shaft. The conical bore wall of the conical bore forms in this case the one sliding bearing surface.

There is no need to design the conical bush as a separate component. It may also be suitable to provide the conical outer jacket of the tensioner arm shaft with circumferentially spaced holes and to form a sliding bearing bush through spraying sliding bearing material onto the jacket to penetrate the holes and engage therebehind. In this manner, an intimate connection e.g. between the tensioner arm and the sliding bearing bush is effected.

Particularly favorable force relationships in the sliding bearing are accomplished when the angle of inclination of the sliding bearing surfaces relative to the tensioner arm shaft ranges between 8° and 30°.

In some circumstances, it may be advantageous to provide at least one sliding bearing surface with circumferentially spaced pockets containing lubricant to ensure optimum damping and sliding properties over an extended period. The lubricant pockets may certainly also be provided on a sliding bearing bush.

Taking into account the load upon the sliding bearing, it is suitable to securely clamp both ends of the helical torsion spring. This ensures that the torsion of the spring does not result in any radial forces which are directed into the sliding bearing and cause undesired edges stress. A secure attachment of the spring ends can also be attained when subjecting each of both ends of the helical torsion spring under torsion by a pair of forces which acts transversely to the longitudinal axis of the helical torsion spring. This is for example the case when the spring as a result of its torsion is supported with its angled end by a tensioner arm fixed first point of support, with one supporting force of one pair of forces acting thereon. The helical torsion spring has a winding connected to this end and bearing upon a second point of support, with the second supporting force of the one pair of forces acting thereon. The other pair of forces is formed in like manner on stationary support points. This also ensures that as a result of the clamped helical torsion spring, no further radial forces act on the sliding bearing.

In a tensioning device according to the present invention, the diverging ends of the sliding bearing preferably face the tensioner arm. Certainly, a reversal of this configuration also results in the advantages as attained by the present invention; However, an increased surface pressure and a resulting increased abrasive wear can be encountered at the converging end of the sliding bearing.

BRIEF DESCRIPTION OF THE DRAWING

The above and other objects, features and advantages of the present invention will now be described in more detail with reference to the accompanying drawing in which:

FIG. 4 is a schematic, sectional illustration of a modified tensioner arm shaft;

FIG. 5 is a schematic, sectional illustration of still another variation of a tensioner arm shaft;

FIG. 6 is a schematic, sectional illustration of a modified fixed structure;

DETAILED DESCRIPTION OF PREFERRED EMBODIMENTS

Figure 1:
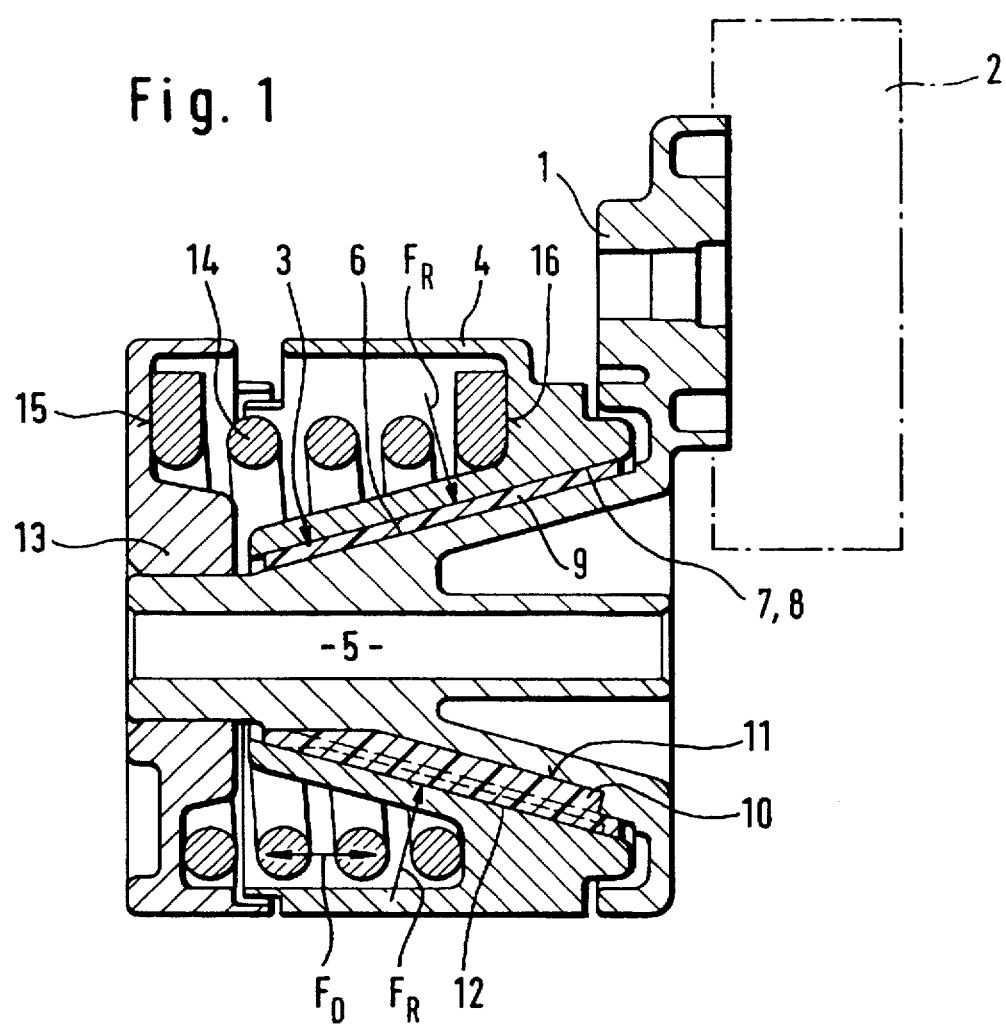
FIG. 1 is a longitudinal section of one embodiment of a tensioning device according to the present invention.

Turning now to the drawing, and in particular to FIG. 1, there is shown a longitudinal section of one embodiment of a tensioning device according to the present invention, including a tensioner arm 1 on which a tensioning roller 2 is secured for engagement on a not shown traction element. e.g. a belt or a chain. The tensioner arm 1 is rotatably supported relative to a housing 4 by a sliding bearing, generally designated by reference numeral 3. The housing 4 is provided with a conical bore 8 defined by a conical wall 7. Formed in one piece with the tensioner arm 1 is a tensioner arm shaft 5 which exhibits an outer conical surface area 6. The tensioner arm shaft 5 is received in the housing 4 within the conical bore 8. The sliding bearing 3 includes a sliding bearing bush 9 which is placed between the outer conical surface area 6 of the tensioner arm shaft 5 and the parallel conical wall 7 of the housing 4, and exhibits an inner conical surface 7 and an outer conical surface 12. In order to effect an interlocking or form-fitting connection between the sliding bearing bush 9 and the tensioner arm shaft 5, the sliding bearing bush 9 is formed with a projection 10 which engages a recess 11 of the tensioner arm shaft 5, as best illustrated in particular in FIGS. 2 and 3. The conical wall 7 and the outer conical surface 12 of the sliding bearing bush 9 form sliding bearing surfaces for rotatable support of the tensioner arm 1 relative to the housing 4. The tensioner arm shaft 5 has a tensioner arm distant end which extends beyond the conical bore 8 of the housing 4 for carrying a support disk 13 which is press-fitted onto this tensioner arm end. Persons skilled in the art will appreciate that the support disk 13 may certainly also be connected in form-fitting or material locking connection with the tensioner arm shaft 5.

Arranged coaxial to the tensioner arm shaft 5 is a helical torsion spring 14 which has one end secured to a support 15 formed by the support disk 13 and another end secured to a fixed support 16 formed by the housing 4. The helical torsion spring 14 is thus axially compressed between the supports 15, 16 to exert an axial pressure force $F_D$ and a torsion force $F_R$ acting perpendicular to the sliding bearing surfaces 7, 12. The diverging ends of the sliding bearing surfaces 7, 12 face the tensioner arm 1, whereby in direction from the converging ends of the sliding bearing surfaces 7, 12 towards the diverging ends of the sliding bearing surfaces 7, 12, the tensioner arm fixed support 15 is arranged ahead of the housing fixed support 16.

The tensioner arm 1 and the tensioner arm shaft 5 are made in one piece, preferably through a die casting process, with aluminum alloy being used as suitable material.

Figure 2:
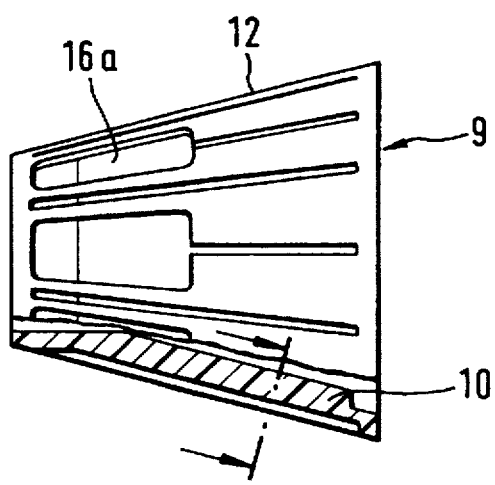
FIG. 2 is a schematic illustration of a sliding bearing bush for use in a tensioning device according to the present invention.
Figure 3:
FIG. 3 is a fragmentary cross sectional view of the sliding bearing bush of FIG. 2, taken along the line III—III in FIG. 2.

FIGS. 2 and 3 show details of the sliding bearing bush 9 and the formed projection 10, and it can be seen that the outer conical surface 12 has formed therein pockets 16a for receiving lubricant to ensure optimum damping and sliding properties over an extended period.

FIG. 4 shows another embodiment of a tensioning device according to the present invention, with a modified tensioner arm 1 in single piece construction with the tensioner arm shaft 5 which is formed by a cylindrical tube 17, with the sliding bearing bush 9 being applied by injection molding onto the cylindrical tube 17. Also in this case, the outer conical surface 12 is selected as sliding bearing surface. As a constant wall thickness should be maintained during injection molding, recesses 19 are formed within the sliding bearing bush 9 in direction towards the diverging ends of the sliding bearing surface 12.

In the event, the configuration of the tensioner arm shaft 5 of FIG. 1 is preferred, it is certainly possible to apply the sliding bearing bush 9 by injection molding onto the outer conical surface area 6 of the tensioner arm shaft 5, as shown in FIG. 5. To effect an intimate connection between the sliding bearing bush 9 and the tensioner arm shaft 5, the tensioner arm shaft 5 has a jacket 20 which is formed with holes 21, with sliding bearing material being sprayed onto the outer conical surface area 6 to penetrate the holes 21 and to engage therebehind.

The procedure described in FIG. 5 for forming the sliding bearing bush 9 can be applied in analogous manner also to the housing 4, as shown in FIG. 6. In this case, holes 22 are provided in a jacket 23 of the housing 4.

Figure 7:
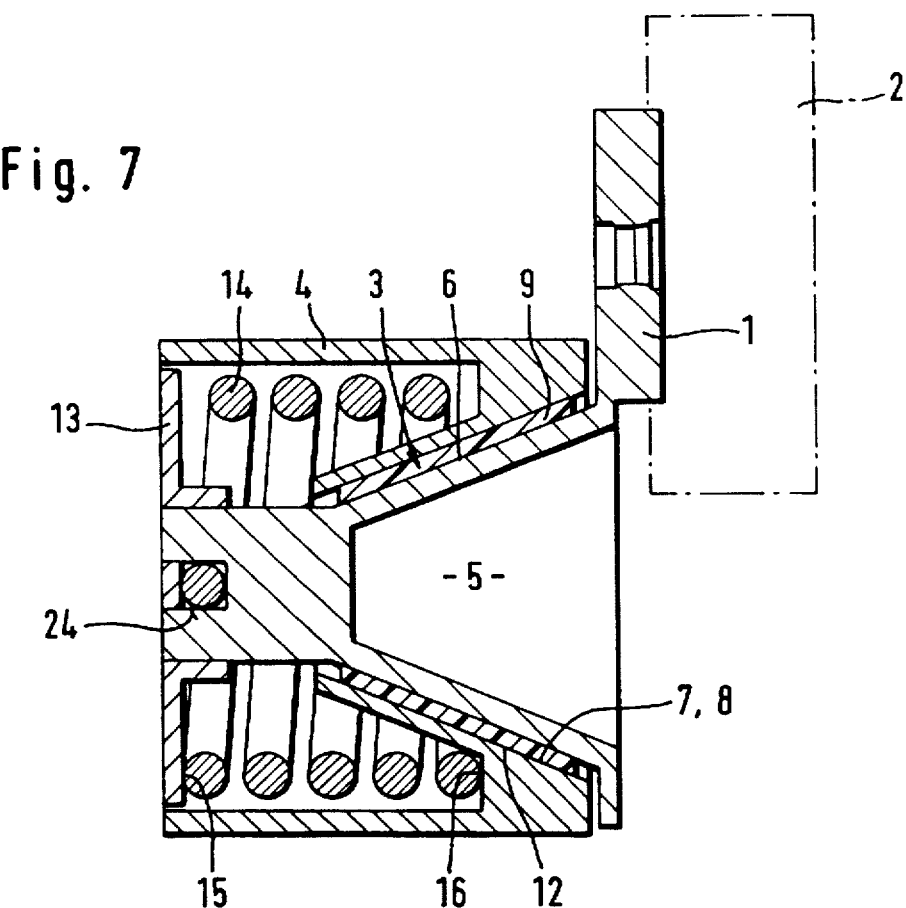
FIG. 7 is a longitudinal section of another embodiment of a tensioning device according to the present invention, similar to the tensioning device of FIG. 1, however with modified tensioner arm fixed support.

FIG. 7 shows a longitudinal section of another embodiment of a tensioning device according to the present invention, which differs from the tensioning device of FIG. 1 in the configuration of the tensioner arm fixed support 15. As shown in FIG. 7, the helical torsion spring 14 is secured with its end facing the support disk 13 in a groove 24 which is formed in the tensioner arm shaft 5, with the support disk 13 engaging in this groove 24 and axially supporting the helical torsion spring 14. A further difference to the tensioning device of FIG. 1 resides in the loose fit of the sliding bearing bush 9 between the tensioner arm shaft 5 and the housing 4. The sliding bearing bush 9 can thus freely rotate relative to the conical wall 7 as well as relative to the conical outer surface area 6 of the tensioner arm shaft 5.

Figure 8:
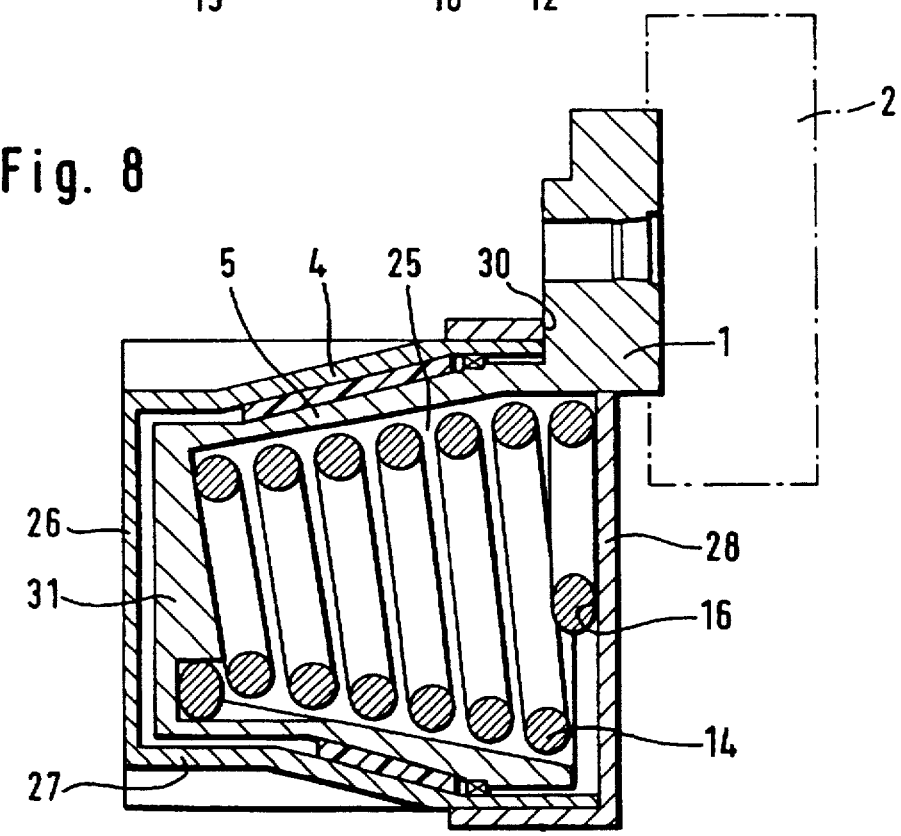
FIG. 8 is a longitudinal section of still another embodiment of a tensioning device according to the present invention.

The embodiment of a tensioning device according to the invention, as shown in FIG. 8, differs from the previous embodiments essentially in the configuration of the tensioner arm shaft 5 which is provided with an axially open recess 25 formed coaxial to the tensioner arm 1 for receiving the helical torsion spring 14. The housing 4 is of pot-shaped configuration and exhibits a bottom 26, an outer jacket 27 and a cover 28 which axially overlaps the jacket 27 and is secured thereto, with the fixed support 16 being formed by the cover 28 for supporting one end of the helical torsion spring 14. The other end of the helical torsion spring 14 rests against a bottom 31 formed by the tensioner arm shaft 5. The jacket 27 and the cover 28 define a circumferential slot 30 for receiving and radially guiding the tensioner arm 1 therethrough.

Figure 9:
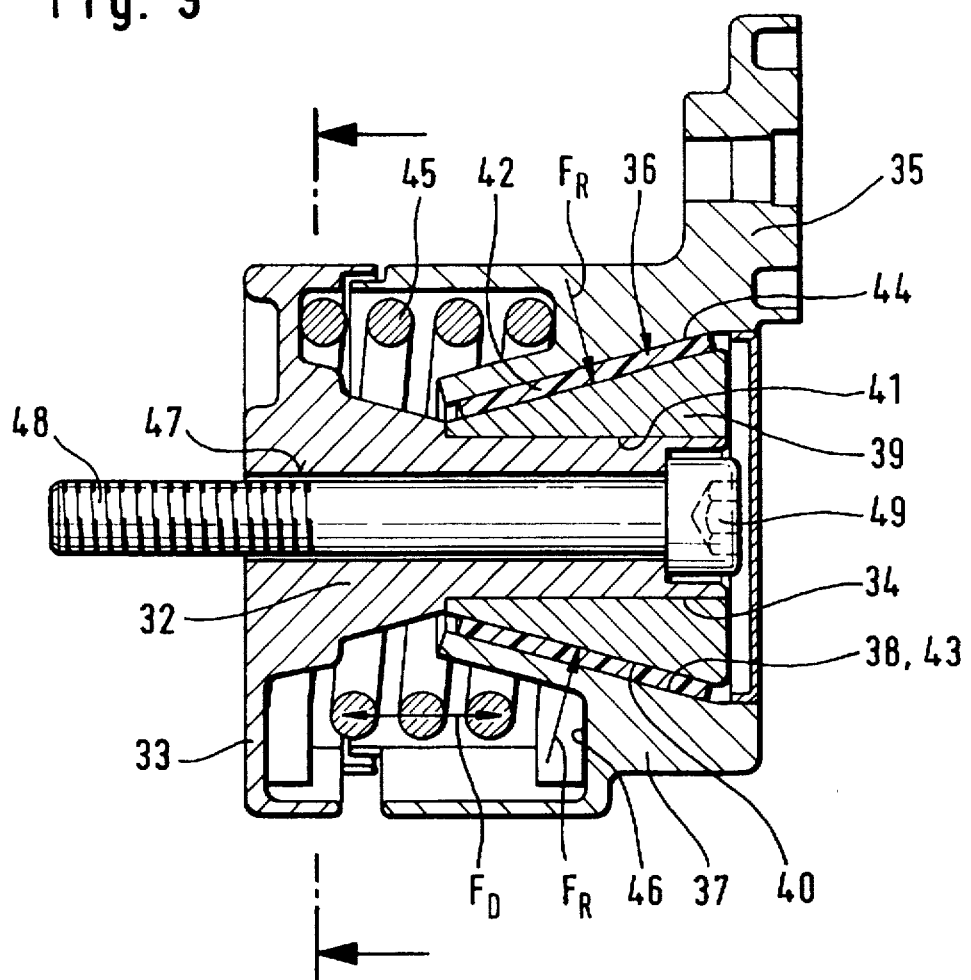
FIG. 9 is a longitudinal section of still another embodiment of a tensioning device according to the present invention.

While in the preceding embodiments of the tensioning device, the tensioner arm shaft 5 is fixedly secured to the tensioner arm 1, FIG. 9 shows a tensioning device with a stationary tensioner arm shaft 32 which is formed with a support flange 33 for attachment to a not shown engine block. The tensioner arm shaft 32 includes a cylindrical section 34 for rotatably supporting a tensioner arm 35 via a sliding bearing, generally designated by reference numeral 36. The tensioner arm 35 includes a tensioner arm jacket 37 which extends coaxial to the tensioner arm shaft 32 and is formed with a conical bore 38, with the tapered end of the conical bore 38 facing away from the tensioner arm 35. Placed between the tensioner arm jacket 37 and the tensioner arm shaft 32 is a conical bush 39 which exhibits an outer conical surface area 40 and an inner cylindrical surface 41, with a conical sliding bearing bush 42 being disposed between the outer surface 40 of the conical bush 39 and the tensioner arm jacket 37. The conical sliding bearing bush 42 and the conical bush 39 may certainly be made in one piece of plastic material, e.g. by injection molding.

Sliding motions are effected in this case between the conical wall 43 of the conical bore 38 and an outer conical surface 44 of the conical sliding bearing bush 42. Clamped between the support flange 33 and a tensioner arm fixed support 46 is a coaxial helical torsion spring 45 to exert an axial pressure force $F_D$ and a torsion force $F_R$ which acts perpendicular to the sliding bearing surfaces 43, 44 of the sliding bearing 36. The tensioner arm shaft 32 is provided with a coaxial throughbore 47, with a screw 48 being directed through the throughbore 47 and screwed onto the not shown engine block. It is certainly possible to provide a washer between the screw head 49 and the sliding bearing bush 42 at the end face proximal to the screw head 49. This ensures that the sliding bearing bush 42 cannot slide off axially from the tensioner arm shaft 32.

Figure 10:
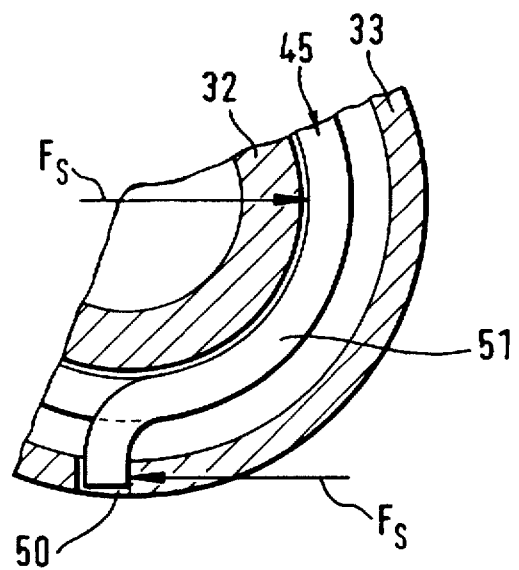
FIG. 10 is a fragmented, sectional view of the tensioning device, taken along the line X—X in FIG. 9 and showing in detail the securement of the ends of the helical torsion spring.

FIG. 10 shows a cross section of the tensioning device of FIG. 9, however without the screw 48, for illustration of the tensioner arm fixed support 46. The angled end of the helical torsion spring 45 engages in an opening 50 of the support flange 33 and is supported circumferentially therein. The helical torsion spring 45 has a winding 51 secured to this end and bearing spotwise on the tensioner arm shaft 32 at two points of contacts which are acted upon by support forces $F_S$ to form a pair of forces. When configuring the stationary support for the helical torsion spring 14 in analogous manner, it is evident that the torsion of the helical torsion spring 45 does not generate a radial force that acts on the sliding bearing. The attachment of the helical torsion spring 45 on the supports, as illustrated with reference to the embodiments according to FIGS. 9 and 10, is certainly applicable in the same advantageous manner for the other embodiments.

Subsequently, the mode of operation of the tensioning device according to the invention is described. The disposition of the helical torsion spring 14, 45 in accordance with the present invention effects that the axial pressure force $F_D$ is introduced into the sliding bearing 3, 36 as a reaction force $F_R$ which acts perpendicular to the sliding surfaces 7, 12, 43, 44. The resulting increased friction dampens in advantageous manner swinging motions of the tensioner arm 1, 35. The tensioning device according to the invention ensures that the tensioner arm 1, is permanently swingably supported without significant clearance relative to the housing 4 and the stationary tensioner arm shaft 32, respectively. As soon as abrasive wear on the sliding bearing surfaces 7, 12, 43, 44 causes a play, an axial displacement of the tensioner arm shaft 5, 32 is effected relative to the tensioner arm 1, 35 to press the sliding bearing surfaces 7, 12, 43, 44 towards each other.

While the invention has been illustrated and described as embodied in a tensioning device for traction means with cone-type sliding bearing, it is not intended to be limited to the details shown since various modifications and structural changes may be made without departing in any way from the spirit of the present invention.

What is claimed as new and desired to be protected by letters patent is set forth in the appended claims:

We claim:

1. A tensioning device for a traction element such as a belt or a chain, comprising:

a fixed structure;

a tensioner arm carrying a tensioning member and being spring-loaded against the traction element, said tensioner arm including a tensioner arm shaft;

a sliding bearing rotatably supporting the tensioner arm on the fixed structure and exhibiting sliding bearing surfaces configured in the form of conical surfaces in parallel relationship to one another and positioned concentrically to the tensioner arm shaft; and a spring wound about the tensioner arm shaft and extending between a support secured on the tensioner arm and a fixed support at exertion of an axial force which is introduced into the sliding bearing in form of a reaction force that acts perpendicular to the sliding bearing surfaces.

2. The tensioning device of claim 1 wherein the spring is a helical torsion spring exerting an axial pressure force.

3. The tensioning device of claim 2 wherein one of the sliding bearing surfaces is disposed adjacent the tensioner arm radially outwards, and another one of the sliding bearing surfaces is disposed adjacent the fixed structure radially inwards, said sliding bearing surfaces flaring outwardly to define converging ends and diverging ends, with the fixed support being positioned ahead of the support secured on the tensioner arm in direction from the converging ends to the diverging ends.

4. The tensioning device of claim 2 wherein one of the sliding bearing surfaces is disposed adjacent the tensioner arm radially inwards, and another one of the sliding bearing surfaces is disposed adjacent the fixed structure radially outwards, said sliding bearing surfaces flaring outwardly to define converging ends and diverging ends, with the support secured on the tensioner arm being positioned ahead of the fixed support in direction from the converging ends to the diverging ends.

5. The tensioning device of claim 1 wherein the tensioner arm shaft is formed radially within the sliding bearing with an axially open recess for receiving the spring, said recess being radially overlapped by the fixed structure.

6. The tensioning device of claim 5 wherein the fixed structure is of pot-shaped configuration to exhibit a bottom, a cover defining the fixed support and a jacket extending between the bottom and the cover, said tensioner arm shaft being received in the fixed structure, with the fixed structure exhibiting a circumferential slot for radially guiding the tensioner arm therethrough.

7. The tensioning device of claim 1 wherein the tensioner arm shaft is stationary and exhibits a cylindrical section for supporting a conical bush which exhibits an outer conical surface and an inner cylindrical surface, said conical bush having a converging end facing a tensioner arm distant end of the tensioner arm shaft, with the tensioner arm shaft being formed with a coaxial throughbore.

8. The tensioning device of claim 1 wherein the tensioner arm shaft has one end which is distant to the tensioner arm and provided with a support flange for forming a support, with the sliding bearing surfaces flaring outwardly to define converging ends and diverging ends, with the converging ends facing the support flange.

9. The tensioning device of claim 1 wherein the tensioner arm shaft has a section formed with circumferentially spaced holes, said sliding bearing including a sliding bearing bush formed by injection molding sliding bearing material onto the section to penetrate the holes and engage therebehind.

10. The tensioning device of claim 1 wherein the sliding bearing surfaces extend relative to the tensioner arm shaft at an angle of inclination ranging between 8° and 30°.

11. The tensioning device of claim 1 wherein at least one of the sliding bearing surfaces is formed with circumferentially spaced lubricant pockets.

12. The tensioning device of claim 11 wherein the sliding bearing includes a sliding bearing bush to form the sliding bearing surfaces, said sliding bearing bush being provided with the lubricant pockets.

13. The tensioning device of claim 1 wherein the spring has two ends which are securely clamped.

14. The tensioning device of claim 1 wherein the spring which is subject to torsion defines a longitudinal axis and has two axial ends, each of which being acted upon by a pair of forces directed transversely to the longitudinal axis of the spring.

* * * * *